(12) United States Patent
Cazes

(10) Patent No.: US 8,911,196 B2
(45) Date of Patent: Dec. 16, 2014

(54) MOTORHOME WITH ONBOARD TOURING CAR, ELEVATOR, AND CREW CABIN

(76) Inventor: Maurice Cazes, Billere (FR)

( * ) Notice: Subject to any disclaimer, the term of this patent is extended or adjusted under 35 U.S.C. 154(b) by 165 days.

(21) Appl. No.: 12/919,117

(22) PCT Filed: Feb. 11, 2009

(86) PCT No.: PCT/FR2009/000154
§ 371 (c)(1), (2), (4) Date: Aug. 24, 2010

(87) PCT Pub. No.: WO2009/118464
PCT Pub. Date: Oct. 1, 2009

(65) Prior Publication Data
US 2011/0000730 A1    Jan. 6, 2011

(30) Foreign Application Priority Data
Feb. 26, 2008 (FR) ...................... 08 01048

(51) Int. Cl.
*B60P 1/12* (2006.01)
(52) U.S. Cl.
USPC ............................ 414/470; 414/480; 296/158
(58) Field of Classification Search
USPC .......... 414/470, 477, 480, 537; 296/157, 158, 296/26.13, 26.14
See application file for complete search history.

(56) References Cited

U.S. PATENT DOCUMENTS

| | | | | |
|---|---|---|---|---|
| 2,103,112 A | * | 12/1937 | Goodman | 414/472 |
| 2,541,288 A | * | 2/1951 | Rice | 414/537 |
| 3,961,716 A | * | 6/1976 | Renaud | 414/537 |
| 4,966,510 A | * | 10/1990 | Johnson, Jr. | 410/26 |
| 5,816,765 A | * | 10/1998 | Pijanowski | 414/477 |
| 5,967,583 A | * | 10/1999 | Wishart | 296/156 |
| 6,692,062 B1 | * | 2/2004 | Woodard et al. | 296/164 |
| 6,729,678 B1 | * | 5/2004 | Atcravi | 296/168 |

FOREIGN PATENT DOCUMENTS

DE    102005036590 A1 *  3/2006
GB    2103551 A *  2/1983

OTHER PUBLICATIONS

DE 102005036590 A1 (Volkner, Gerhard) Mar. 23, 2006 (English language machine translation). [online] [retrieved Mar. 27, 2012]. Retrieved from: Espacenet (http://worldwide.espacenet.com/advancedSearch?locale=en_EP).*

* cited by examiner

*Primary Examiner* — Jonathan Snelting
(74) *Attorney, Agent, or Firm* — Steven Rinehart

(57) ABSTRACT

The invention relates to a two-level motorhome with, on the lower level: a receptacle for a car, accessed perpendicularly to the longitudinal axis of the motorhome; and, on the upper level: two independent living areas. One is at the front, with three slide-outs, two of them right above the car receptacle, served by a staircase and an elevator car that goes right down to the ground, and adapted to accommodate four people enjoying a living room that can be converted into a room with twin beds closed off by rigid partitions. One is at the rear, used as a cabin to house a two-person crew, served by an independent staircase. The motorhome according to the invention is adapted for land tours for four individuals who wish to have use of a car and elevator, and to leave all the operating logistics to a crew. It is particularly suited to time-sharing and rental.

10 Claims, 9 Drawing Sheets

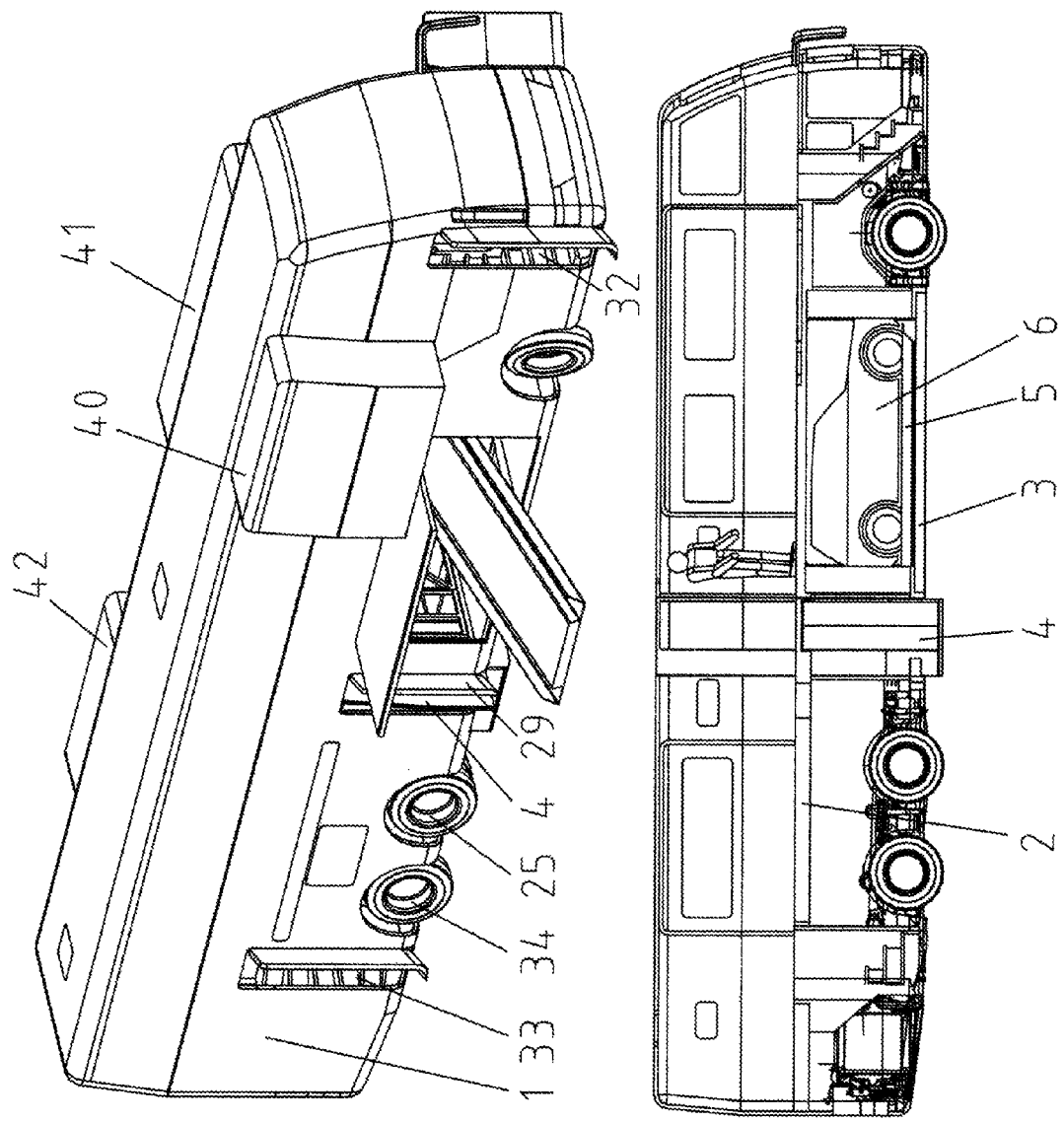

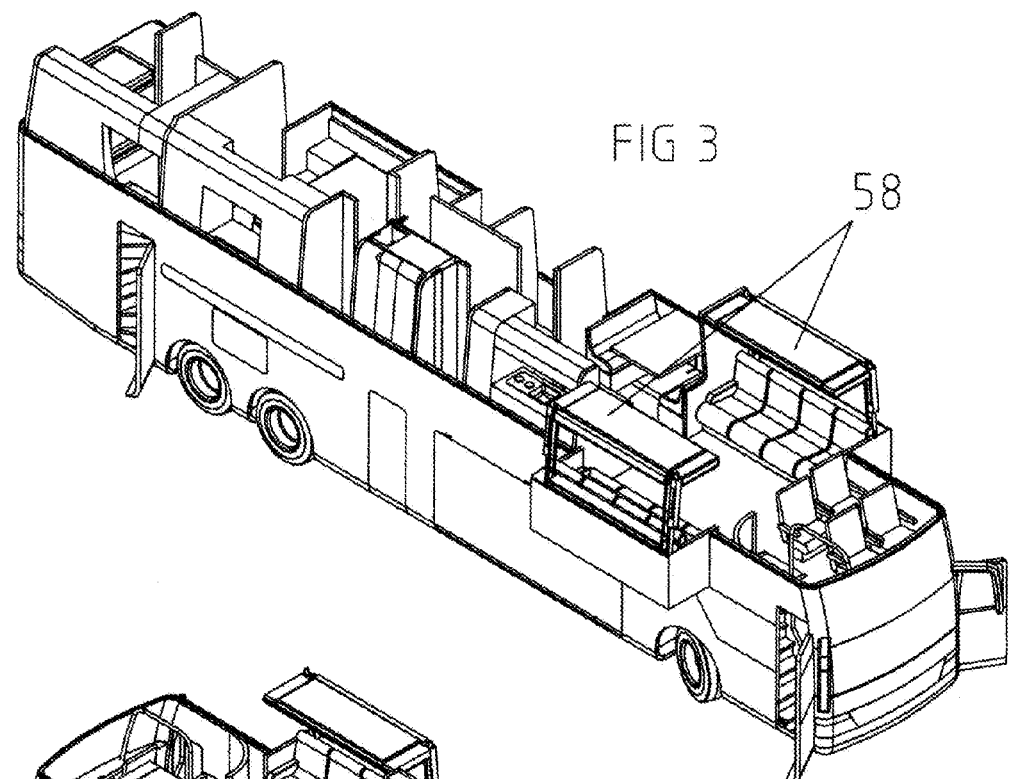
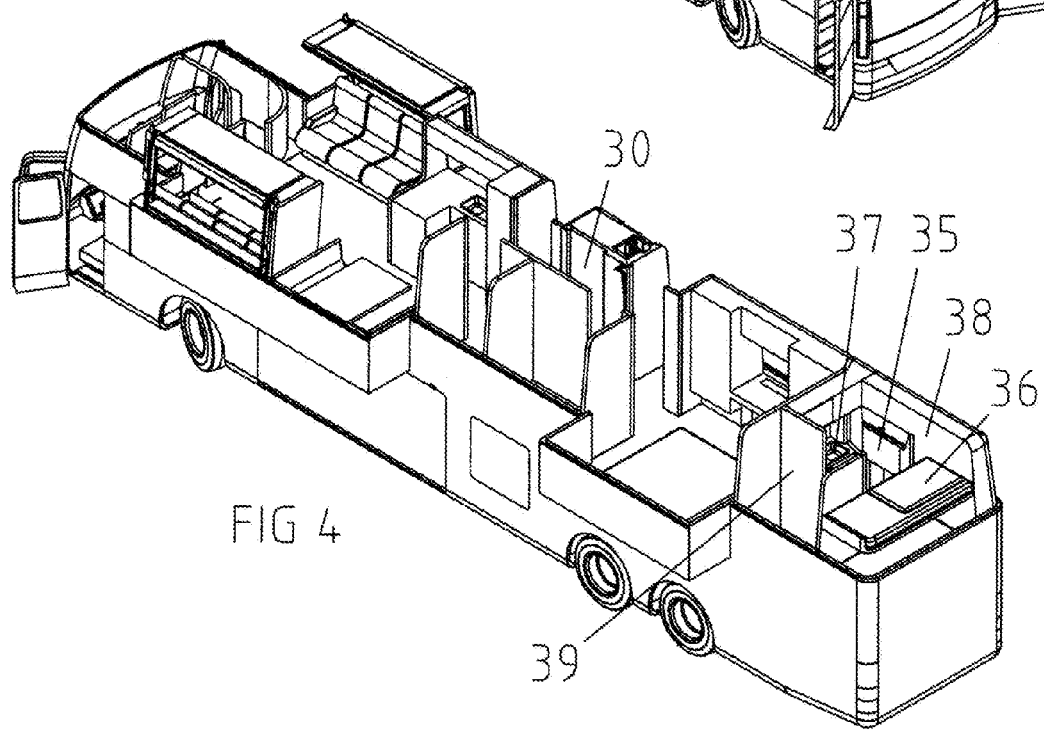

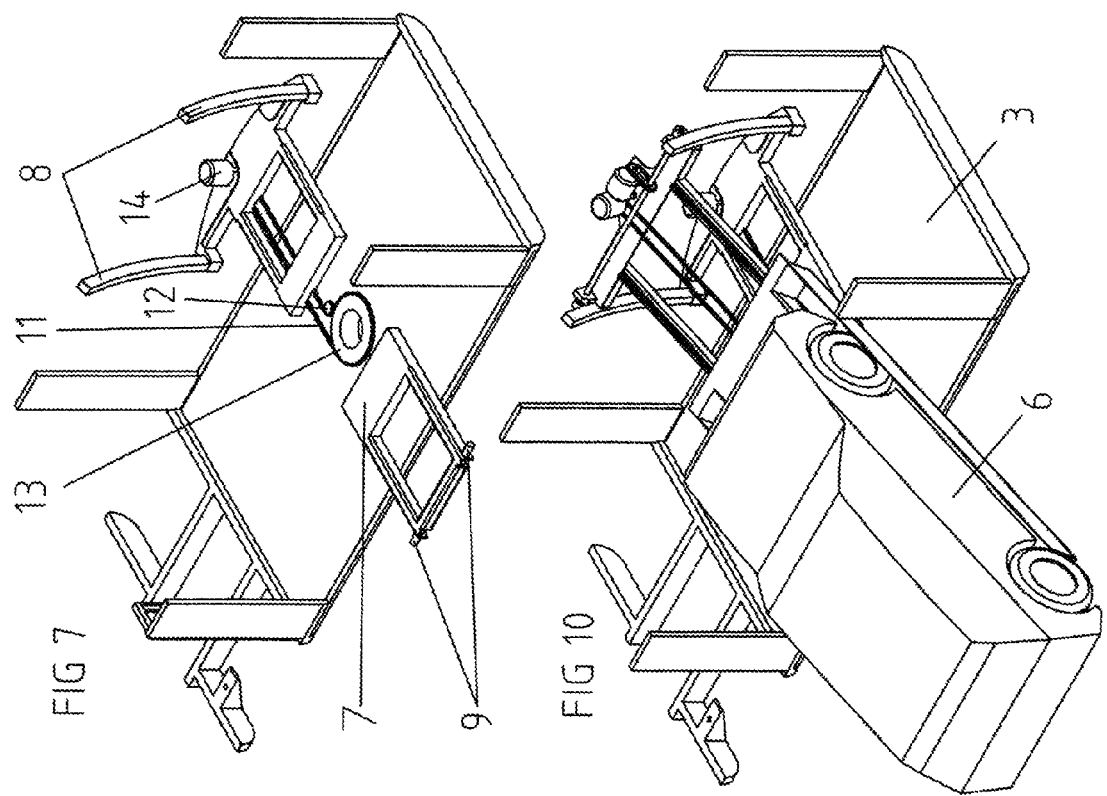
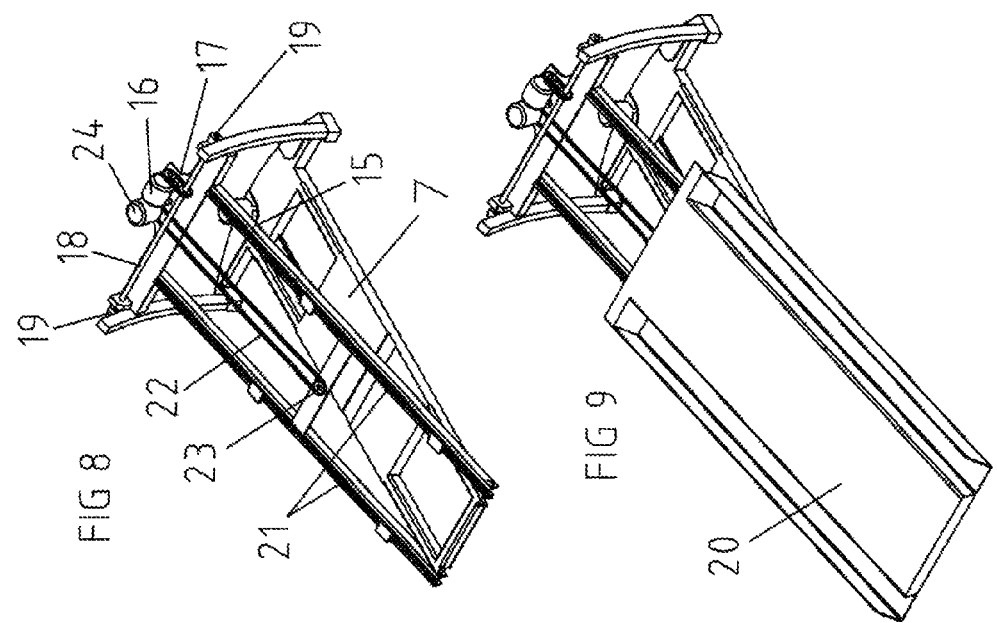

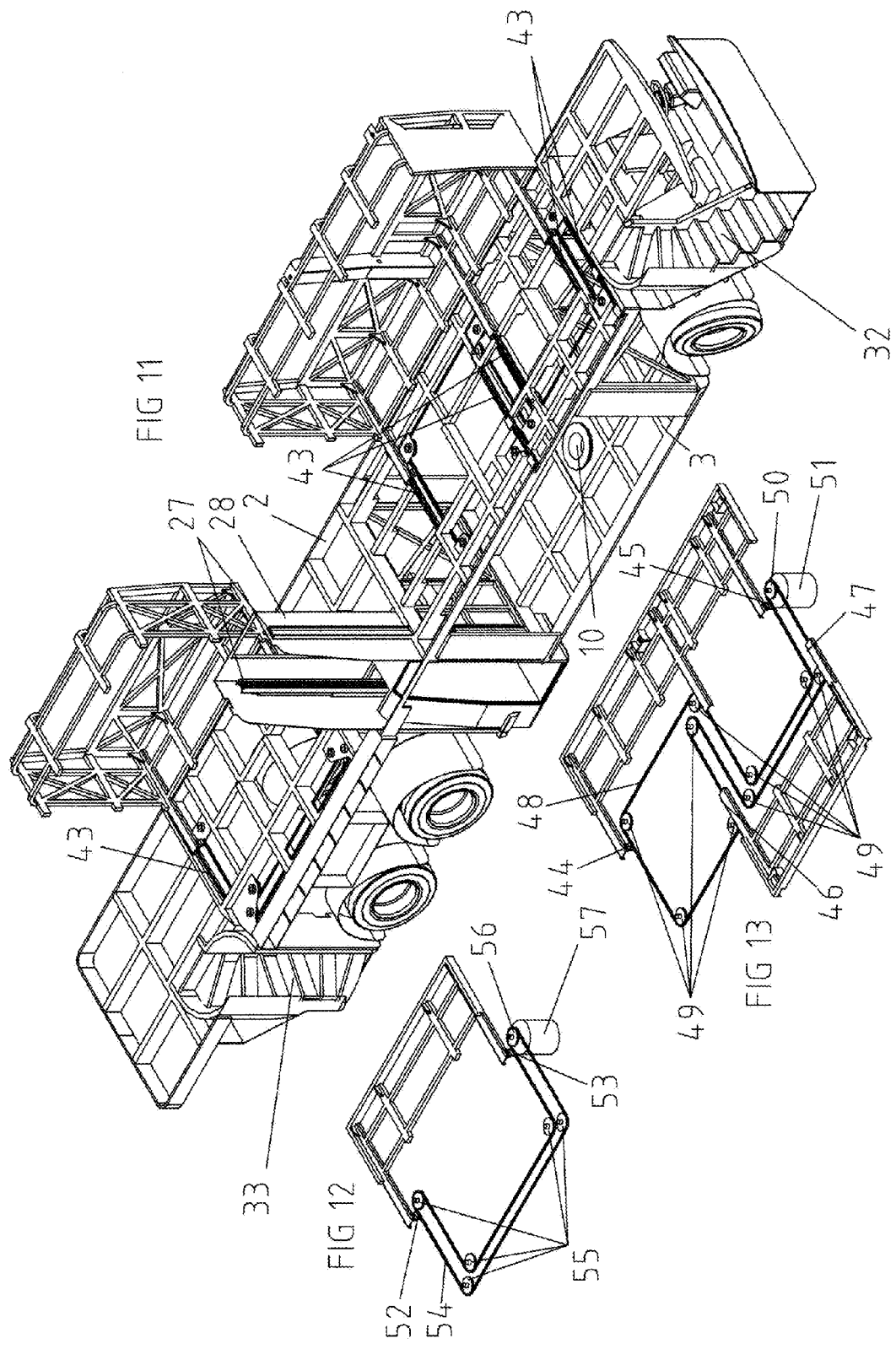

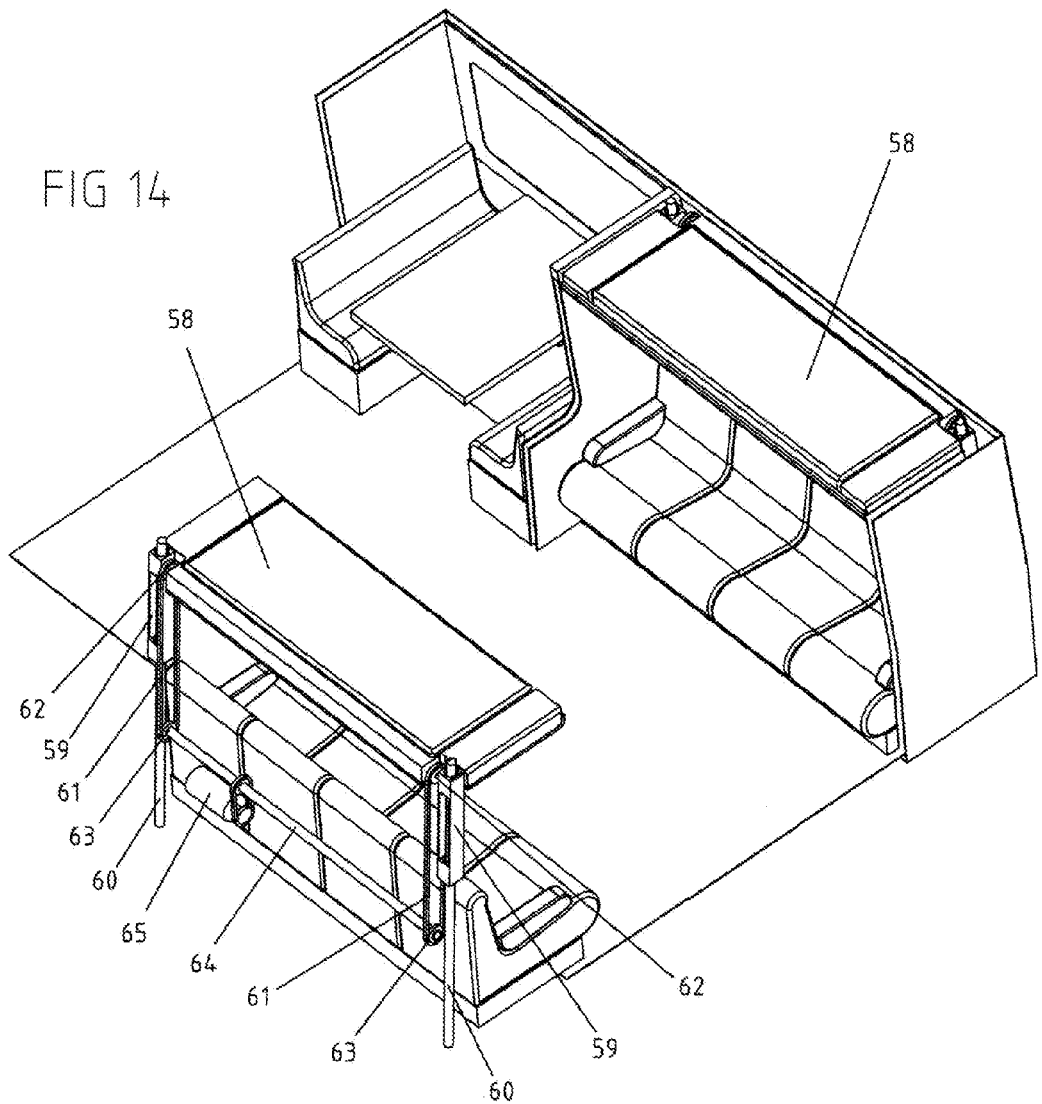

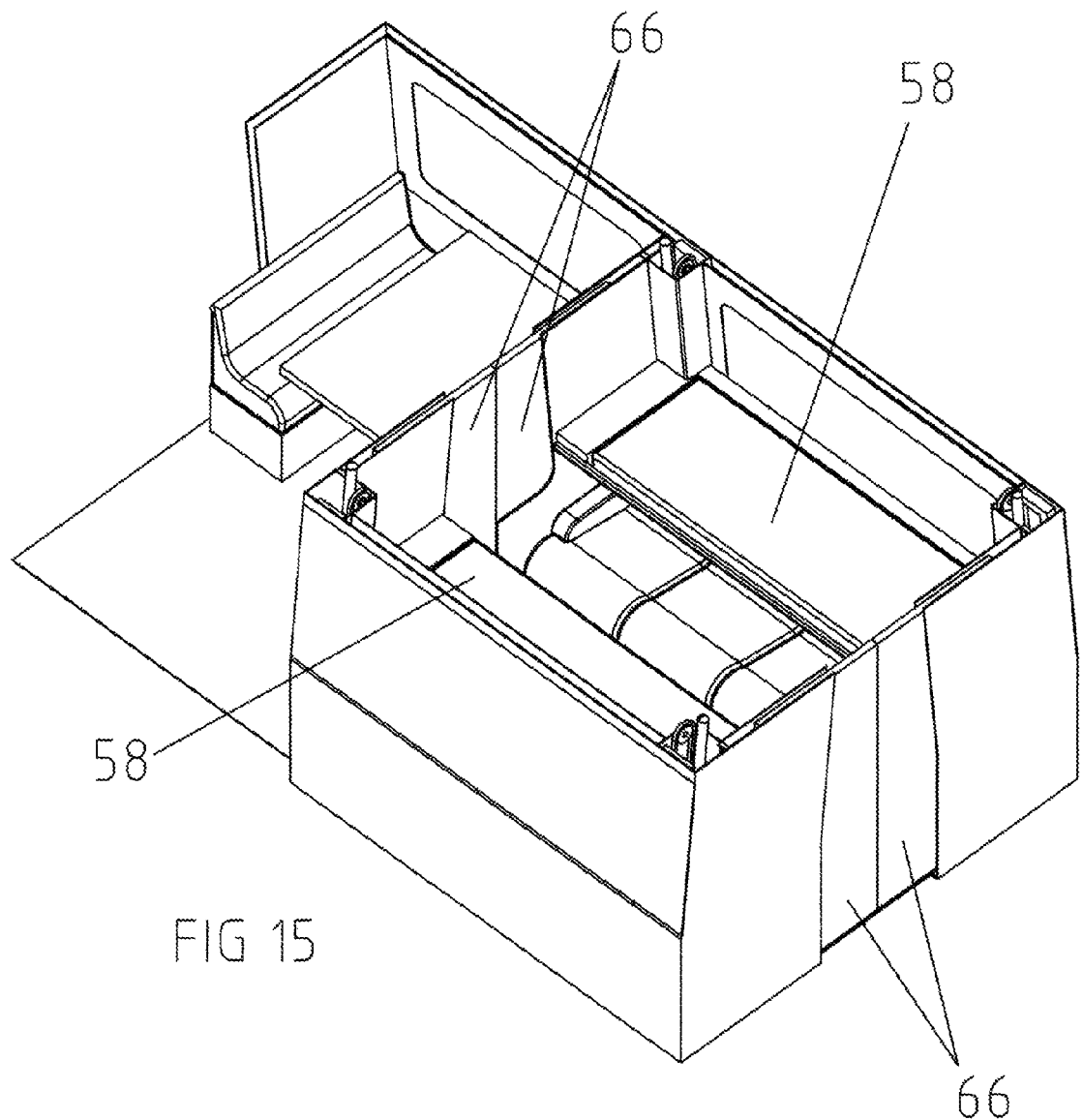

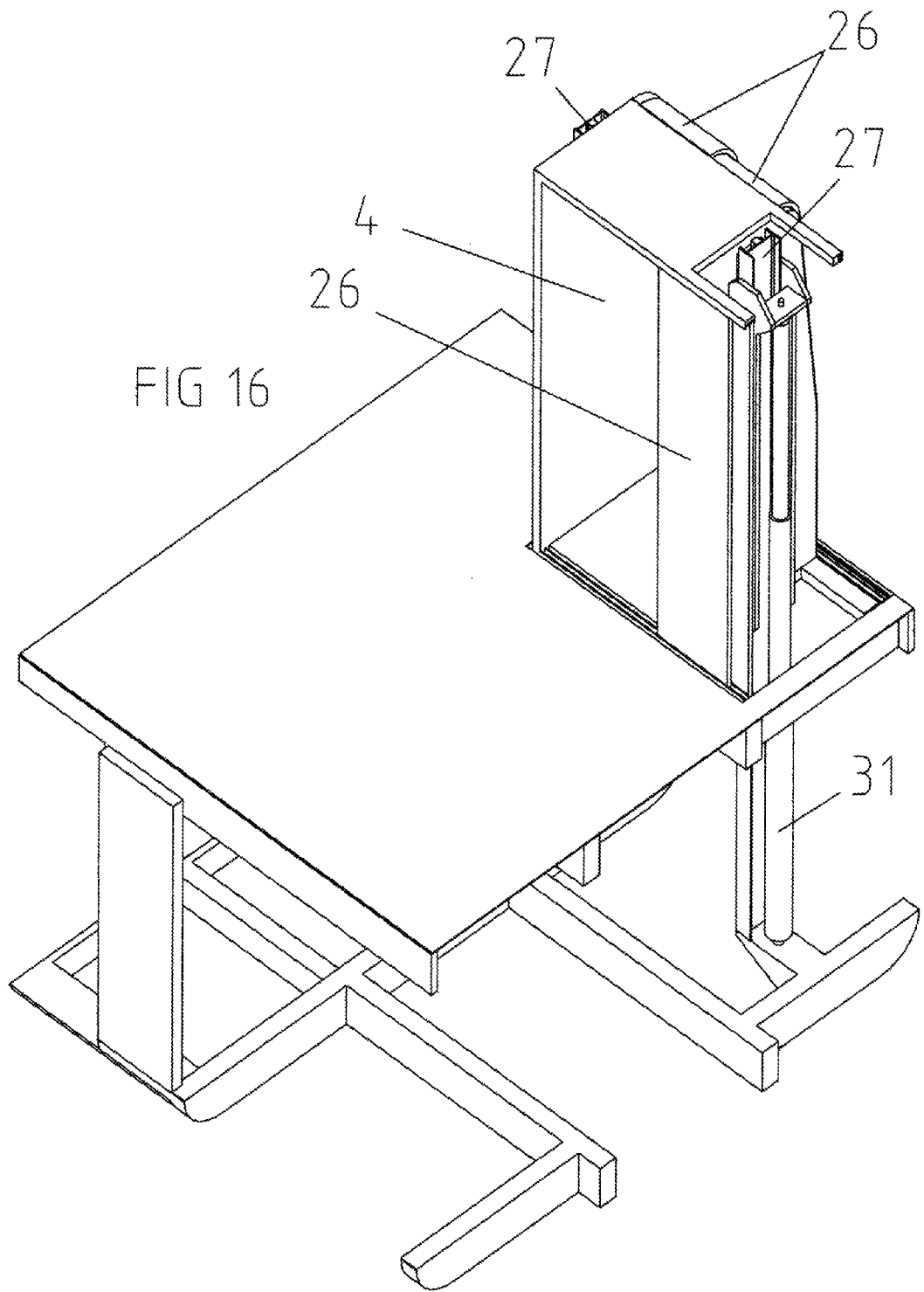

MOTORHOME WITH ONBOARD TOURING CAR, ELEVATOR, AND CREW CABIN

PRIORITY CLAIM

This application claims priority from, and is a continuation of, International Application No. PCT/FR2009/000154 filed Feb. 11, 2009, based on French patent FR2927856 (A1), filed on Feb. 26, 2008.

BACKGROUND OF THE INVENTION

1. Field of the Invention

This invention relates to triple-axle motorhomes with an integrated shell, a front steering axle, an anterior rear axle, and posterior rear axle. The motorhome with onboard touring car, elevator, and crew cabin is disclosed with two levels, an upper lever and a lower level.

The upper level is livable over its entire area, divided into two portions served by: a rear section comprising a staircase located rearward from the posterior rear axle of the vehicle; and, a front section, comprising an inside elevator with a car located forward of the anterior rear axle and a staircase located forward of the front steering axle of the vehicle.

The lower level comprises a rear section, a front section, and a central section. The rear section comprises the engine-transmission assembly. The front section comprises the driving cab. The central section comprises: a receptacle which is large enough to accommodate a touring car positioned along the longitudinal axis of the motorhome but entering it via a ramp that is perpendicular to this axis.

2. Description of the Related Art

To this day, existing motorhomes do not take onboard any car, perpendicularly to their longitudinal axis; do not have any access staircase on the upper level, rearward of their rear axle; do not have any interior elevator going down to the ground; and are not provided with: an insulating integrated shell, or full shell, two distinct and functional accommodation areas, slide-outs directly above the car receptacle, or electrically retractable permanent beds, or a living room area that can be converted into a bedroom which is directly and independently accessible and closed off by rigid partitions.

The aforementioned characteristics have the following drawbacks:

Necessity of a chassis having a recess adapted to accommodate the car support platform and requiring either to take on board only a car of small height, of the cabriolet type, and therefore seating only two people, or to lift the motorhome by means of hoists to enable taking on board a four-passenger car corresponding to the housing capacity of such a vehicle (see patents DE 20 2004 012 073 U1 2004.11.11 and DE 102005 036 590 A1 2006.03.23);

A necessarily weakened chassis perpendicularly to the platform since presenting a continuity solution at this level;

Loading and unloading of the car forcing the latter to cross over the threshold of the platform;

The platform going vertically down to make ground contact to then be displaced horizontally a few millimeters from the latter implies that it must be perfectly planar and with no roughness or unevenness over the entire surface necessary to its displacement;

Car loading parallel to the axis of the motorhome implying that it must be very close to the latter for the maneuver, hence a guiding complication;

Necessity of loading it in a direction such that the driver can get in and out of the car, namely, on the side opposite the motorhome;

Loading and unloading the car can be done on one side of the motorhome only;

Accessing the upper level is difficult for elderly people or people with reduced mobility. Indeed, they have to go up a very high first step and a very steep staircase;

Impossibility for the people touring to have a crew, which means that at least one of them must have a license for driving heavy weight vehicles, and for driving a particularly cumbersome vehicle;

Obligation for them to carry out logistical and administrative tasks;

Impossibility of having slide-outs above the car receptacle because their maneuver mechanism is generally cumbersome;

No living room that can be instantaneously and automatically converted into a bedroom with always-made twin beds;

No room having the size of the vehicle, being directly and independently accessible and which can be entirely closed off by rigid partitions; and Low chassis of the vehicle that is not integrated to the body and is therefore subject to bad weather and road debris.

SUMMARY OF THE INVENTION

The motorhome according to the invention allows these drawbacks to be overcome.

First, it is constituted of an integrated, or full, shell that is thermally insulated with the exception of the engine-transmission compartment, inside of which two chassis are superposed:

An upper chassis with a floor;

A lower chassis having three portions: a rear portion which supports the engine-transmission assembly, a front portion dedicated to the driver cab, and a central portion which accommodates the elevator and the system adapted to load and unload the car either on the right or the left side.

This system comprises an assembly of three superposed elements, including:

A lower structure pivoting horizontally;

An inclinable intermediate structure, one end of which is articulated on one of the ends of the pivoting structure, the other end going up and down; and An upper structure constituted of an access ramp supporting the car and sliding on the intermediate structure so as to come in contact with the ground only in two points.

It is also equipped with a cabin elevator moving in a shaft provided with two landing doors, a low one opening out onto the outside and a high one opening out onto the inside. Its advantage resides in the fact that the cabin elevator car can go right down to the ground, thus facilitating its access since one only has to cross over a threshold of a few centimeters to enter it.

Furthermore, the present invention provides:

An staircase rearward of the posterior rear axle makes it possible to arrange the rear portion of the upper level as an independent cabin reserved for a two-person crew which is therefore provided with a direct and independent access; and An staircase frontward of the steering axle to provide, in addition to access by the elevator, a direct and independent access to a room with twin beds.

Finally, the vehicle is equipped with three slide-outs, two front and one rear, sliding on slides, and whose opening and closing are controlled:

The two front slide-outs activate simultaneously and symmetrically.

The rear slide-out activates independently. The front slide-outs are above the living room couches and comprise two one-person beds which are symmetrically arranged, which, in the daytime, are flattened against the ceiling of the slide-out and, at nighttime, go down to the level of the back of the couches.

These two slide-outs are equipped with movable partitions sliding in their sides which enable completely isolating the living room converted for the night into a bedroom with two already-made twin beds.

BRIEF DESCRIPTION OF THE DRAWINGS

The attached drawings show the invention:

FIG. 1 depicts a ¾ right front perspective view of the present invention, opened trap doors and slide-outs, platform for loading the car in the exit position on the right side;

FIG. 2 depicts a longitudinal cross-section of the present invention, viewed from the right side, elevator in the low position, and car loaded;

FIG. 3 depicts a ¾ right front perspective view of the upper level of the motorhome;

FIG. 4 depicts a ¾ left rear perspective view of the upper level of the motorhome;

FIG. 7 depicts a ¾ right front perspective view of the low chassis equipped with the pivoting frame of the car loading system, cut-away at its center in order to show the toothed wheel affixed to the chassis;

FIG. 8 depicts a ¾ right front perspective view of the pivoting frame equipped with the inclinable structure;

FIG. 9 depicts a ¾ right front perspective view of the pivoting frame equipped with the inclinable structure, which is itself equipped with the sliding platform;

FIG. 10 depicts a ¾ right front perspective view of the entire loading system supporting the car;

FIG. 11 depicts a ¾ right front perspective view of the two superposed chassis and of the elevator in the low position in its shaft, high chassis equipped with tubular structures of left slide-outs;

FIG. 12 depicts a ¾ right front perspective view of the maneuvering system of the rear slide-out;

FIG. 13 depicts a ¾ right front perspective view of the of the maneuvering system of the two front slide-outs;

FIG. 14 depicts a ¾ right front perspective view of the two front slide-outs opened in the "living room" position, the motorhome being stationary; and FIG. 15 depicts a ¾ right front perspective view of the two front slide-outs closed in the "twin-beds bedroom" position, and movable slidable partitions also closed.

FIG. 16 depicts a ¾ left rear perspective view of the elevator in the high position.

DETAILED DESCRIPTION OF THE INVENTION

Figure 5:
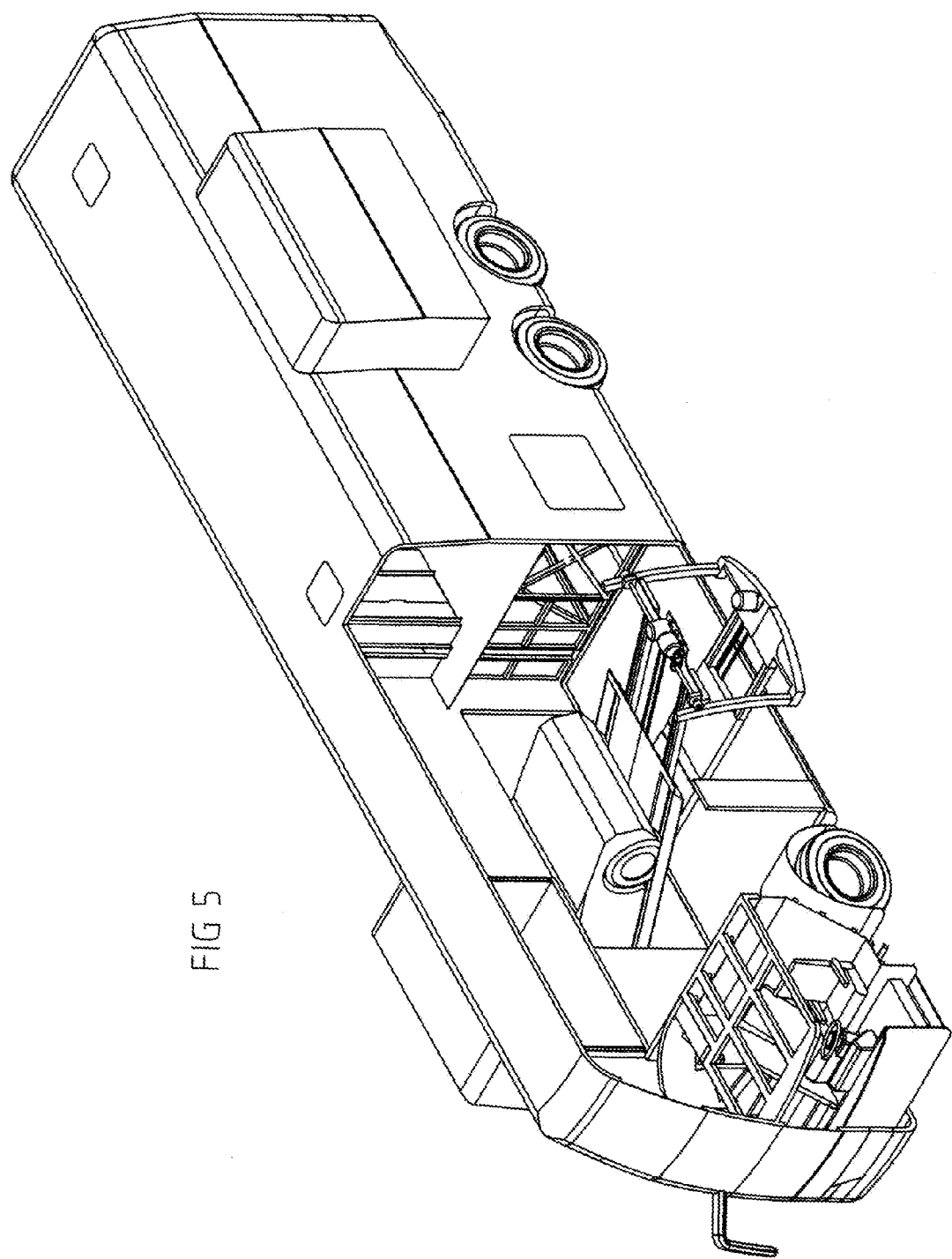
FIG. 5 depicts a ¾ left front perspective view of the motorhome, peeled-back on the front left portion, car in the loading or unloading position from the right.
Figure 6:
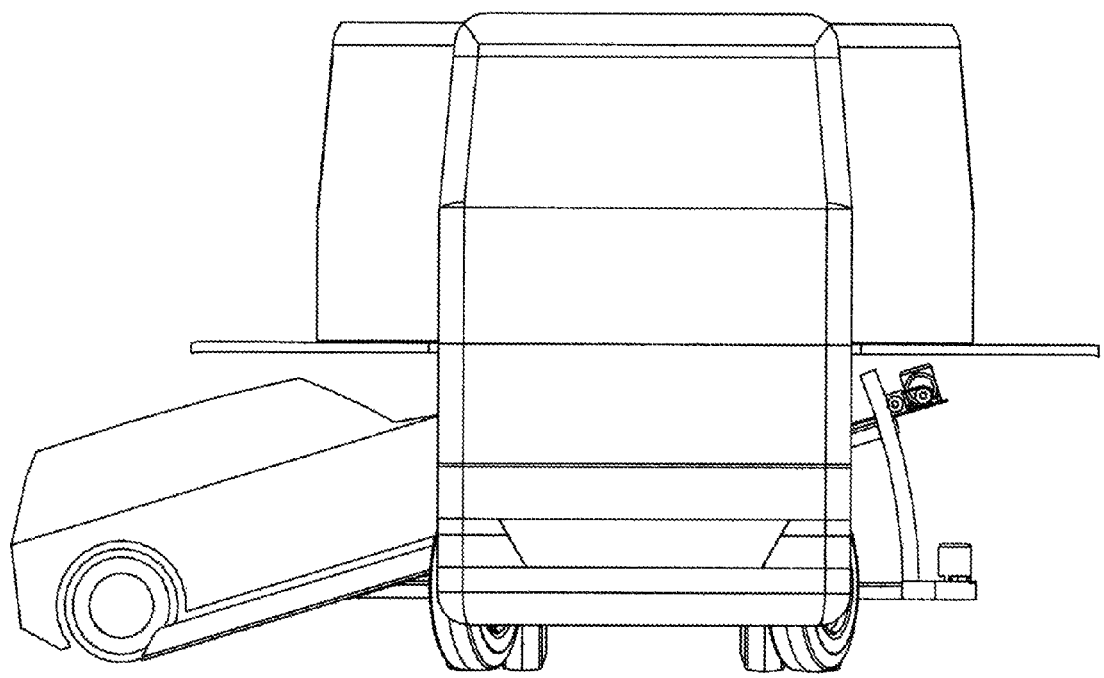
FIG. 6 depicts front view of the motorhome, car in the loading or unloading position from the right.

With reference to these drawings, the motorhome comprises a full shell (1) inside of which two chassis are superposed without a continuity solution.

An upper chassis (2) is taught with a floor over the entire length of the vehicle.

A lower chassis (3) is taught in three portions:

A rear portion which supports the engine-transmission assembly and the tandem axle;

A front portion which accommodates the steering axle and the lowered driver cab;

A central portion which accommodates the elevator (4) and its mechanism and the system (5) adapted to load and unload the car (6). This system is constituted of an assembly of three superposed elements:

The lower element is constituted of a pivoting frame (7) provided on one of its ends with two vertical toothed racks in an arc of circle (8) and on another end with two half shafts (9). It is also equipped with a vertical shaft rotating in a central bore (10) of the low chassis (3). Its rotation is carried out by a roller chain (11) traveling on a toothed wheel (12) freely rotating on an shaft fixed on the frame itself and connecting two toothed wheels, a stationary one (13) affixed to the chassis of the motorhome and the other at the end of a shaft of a gear motor having a vertical axle (14) affixed to the frame. Conversely, the gear motor could be affixed to the chassis of the motorhome and the toothed wheel (13) affixed to the frame (7);

The intermediate element is an inclinable structure (15), one end of which is articulated around the two half shafts (9) of the lower element and its other end goes up and down by means of a gear motor having a horizontal axle (16) affixed to the structure itself, driving, by means of a chain (17) a shaft (18) at the end of which two pinions (19) gear meshed on the two toothed racks (8) of the lower element. This up and down movement could also be achieved by a chain or cable system; and The upper element is a platform (20) supporting the car (6). It slides on the inclinable structure (15) by means of the two slides (21) and is affixed to one of the chain links of a roller chain (22) connecting a free toothed wheel (23) whose axle is fixed on the upper portion of the inclinable structure (15), to a toothed wheel mounted at the end of a shaft of a gear motor having a vertical axle (24) fixed also to the upper portion of this structure.

The unloading of the car is carried out in three operations:

A 90° rotation of the pivoting frame (7) toward the right or the left causing the rotation of the two other structures;

Displacement of the platform (20) and simultaneous tilting of the inclinable structure (15) which causes the car-supporting platform to tilt, down to the point when it reaches the ground; and Release the car by simply rolling it on the platform. Its loading is carried out in the reverse order.

Then, the motorhome is equipped, frontward of the anterior rear axle (25) with a cabin elevator car (4) having two opposite sliding double doors (26), being displaced on two vertical guides (27) in a shaft (28) provided with two landing doors, a low one (29) opening out onto the outside of the vehicle and a high one (30) opening out onto the inside.

The up and down, or rise and fall, movement of the cabin elevator car is carried out by a two-piston hydraulic jack and at constant speed (31) fed by a electrohydraulic generator unit but could also be carried out by a cable or chain electric system driven by a gear motor.

The opening and closing of the sliding doors are manual but could be automated, the landing doors are opened manually and closed by simple return.

The advantage of the system resides in the fact that the cabin elevator car moves inside the vehicle and that it can go right down to the ground, thus facilitating its access since one only has to cross a threshold of a few centimeters to enter it.

Furthermore, the motorhome is provided with two stairs, one (32) frontward of the front steering axle and one (33) rearward of the posterior rear axle (34), it allows for, on the one hand, having a direct and independent access to a room with twin beds, and on the other hand, accommodating a cabin (35) for a two-person crew in the rear portion of the upper level which also has a direct and independent access.

This cabin comprises:

Two bunk beds (36), the upper one having a fold-up portion serving as a backrest to the lower one which is then converted into a couch;

A complete cooking unit (37) including sink, cooktop, fridge, microwave oven, television screen, and fold-up seating facing the couch;

A large dressing-room (38); and

A bathroom (39) comprising a sink, shower, toilet, and a fold-up portion which turns into a table.

Finally, the vehicle is equipped with three slide-outs, two front ones: right (40) and left (41) and a rear one (42) sliding on slides (43).

The front slide-outs are each affixed to two chain links (44-45-46-47) of a roller chain (48) traveling on several free toothed wheels (49), actuated by a toothed wheel (50) mounted at the end of a shaft of a gear motor having a vertical axle (51) which, turning in one direction or the other, controls the simultaneous and symmetrical opening and closing of the slide-outs.

The rear slide-out is, following the same principle, affixed to two chain links (52-53) of a roller chain (54) traveling on several free toothed wheels (55) actuated by a toothed wheel (56) mounted at the end of a shaft of a gear motor having a vertical axle (57) which, turning in one direction or the other, controls the opening and the closing of the slide-out. In each of the front slide-outs and above the living room couches a one-person bed (58) is installed, supported by two arms (59) guided by two slides (60), one by the headboard, and one by the footboard. Each of these arms is affixed to a chain link of a roller chain (61) connecting an upper toothed wheel (62), whose axle is fixed to the structure of the slide-out, and a lower toothed wheel (63) at the end of a unique shaft (64) turning on two bearings affixed to the structure of the slide-out and actuated by a gear motor (65).

The two front slide-outs are equipped with movable partitions (66) sliding in their sides, allowing for completely isolating the living room converted, for the night, into a room with always-made twin beds.

It must be noted that all the roller chains hereinabove mentioned can be replaced by notched belts traveling on wheels, also notched, or by cables traveling on pulleys. In these cases, the movable elements are not affixed to a chain link but rather connected to one point of the belt or of the cable.

The motorhome according to the invention is adapted for land tours in a spacious mobile apartment, which comfortably accommodates four passengers, even elderly or those with reduced mobility, who wish to have, around-the-clock, the use of a car and to leave the driving of the vehicle and the operating logistics to a two-person crew.

It is particularly suited to time-sharing and seasonal rental.

What is claimed is:

1. A motorhome comprising an integrated shell, the integrated shell comprising two superposed chasses:

An upper chassis comprising a floor spanning a length of the motorhome;

A lower chassis comprising three portions:
(a) a rear portion which supports an engine-transmission assembly and a tandem axle;
(b) a front portion which receives a steering axle and a driving cab;
(c) a central portion which houses an elevator, and an elevator mechanism, and a mechanical system adapted to load and unload a car, said system being comprised of an assembly of three superposed elements:
(i) a lower element comprising a pivoting frame, the pivoting frame comprising two or more ends, wherein one end comprises two vertical toothed racks in semi-circle, and another end comprising two half shafts and a vertical shaft rotating in a central bore of the low chassis, wherein a rotation of the pivoting frame is effectuated by a roller chain traveling on a toothed wheel freely rotating on an axle fixed on the frame and connecting two toothed wheels, one that is stationary affixed to the chassis of the motorhome and another wheel at the end of a shaft of a gear motor comprising a vertical axle affixed to the frame;
(ii) an intermediate element comprising an inclinable structure, wherein one end of the structure is articulated around two half shafts of the lower element; and wherein the other end of the structure rises and falls by means of gear motor having a horizontal axle affixed to the structure, wherein the gear motor is driven by means of a chain, a shaft comprising two pinions at ends of the shaft which pinions are geared on the two toothed racks of the lower element; and
(iii) an upper element comprising a platform supporting the car, sliding on the inclinable structure by means of two slides and affixed to one of the chain links of a roller chain connecting a free toothed wheel whose axle is fixed on an upper portion of the inclinable structure to a toothed wheel mounted at an end of a shaft of a gear motor having a vertical axle fixed also to the upper portion of the inclinable structure.

2. The motorhome of claim 1, further comprising slide-outs directly above a receptacle of a touring car, a right slide-out and a left slide out, both sliding on slides.

3. The motorhome of claim 2, wherein the left slide-out and right slide-out are each connected to two chain links of a roller chain traveling on several free-toothed wheels comprising vertical axles, actuated by a toothed wheel mounted at an end of a shaft of a gear motor comprising a vertical axle which, when turning in any direction, controls a simultaneous and symmetrical opening and closing of the left slide-out and the right slide-out.

4. The motorhome of claim 2, wherein the left slide-out and right slide-out are equipped with sliding on their sides.

5. The motorhome of claim 1, further comprising beds retractable in a vertical linear motion.

6. The motorhome of claim 1, wherein beds are supported by two arms guided by two slides affixed to the upper chassis.

7. The motorhome of claim 6, wherein the arms are each connected to a chain link of a roller chain traveling between an upper toothed wheel turning freely on an axle fixed to the upper chassis and a lower toothed wheel at an end of a unique shaft turning on two bearings, which bearings are fixed to the structure and actuated by a gear motor.

8. The motorhome of claim 1, further comprising a cabin elevator with sliding doors located inside the motorhome for accessing a living level.

9. The motorhome of claim 8, wherein the elevator descends to ground level.

10. The motorhome of claim 1, wherein an upper level comprises two distinct, directly accessible living areas.

* * * * *